United States Patent [19]

Barteck

[11] 4,403,229

[45] Sep. 6, 1983

[54] MAINTENANCE SYSTEM TO PRIME AND TO EXCLUDE AIR FROM INK JET HEADS

[75] Inventor: Joseph C. Barteck, Tucson, Ariz.

[73] Assignee: International Business Machines Corporation, Armonk, N.Y.

[21] Appl. No.: 316,479

[22] Filed: Oct. 30, 1981

[51] Int. Cl.³ .............................................. G01D 5/42

[52] U.S. Cl. ..................................................... 346/75

[58] Field of Search .......................... 346/1.1, 75, 140; 239/101, 102

[56] References Cited

U.S. PATENT DOCUMENTS

| | | | |
|---|---|---|---|
| 3,719,952 | 3/1973 | Elbaum | 346/75 |
| 3,761,953 | 9/1973 | Helgeson et al. | 346/140 IJ X |
| 3,805,276 | 4/1974 | Ishii | 346/140 |
| 3,848,118 | 11/1974 | Rittberg | 239/101 |
| 3,924,974 | 12/1975 | Flechbeck et al. | 239/101 X |
| 4,042,937 | 8/1977 | Perry et al. | 346/140 IJ X |
| 4,152,710 | 5/1979 | Matsuba et al. | 346/75 X |

OTHER PUBLICATIONS

IBM Technical Disclosure Bulletin, Jun. 1981, vol. 24, No. 1B, p. 840.

IBM Technical Disclosure Bulletin, Jun. 1981, vol. 24, No. 1B, pp. 841–842.

*Primary Examiner*—Donald A. Griffin

*Attorney, Agent, or Firm*—Homer L. Knearl; Joscelyn G. Cockburn

[57] ABSTRACT

The ingestion of air into the print head of an ink jet printer is controlled by a secondary fluidic system. The secondary fluidic system interconnects the ink supply cavity of the head with the primary fluidic system of the printer. The secondary fluidic system includes a valve which is coupled to a venting port of the print head. A rapid decompression regulator is coupled to the valve. The exit port of the regulator is attached to one end of a conduit. The other end of the conduit is disposed in a fluid-containing reservoir. The reservoir serves as an expansion/contraction chamber and keeps air from entering the head even under extreme thermocycling conditions. Likewise, the regulator controls the pressure in the head so that head pressure ($P_h$) is greater than or equal to ambient pressure $P_a$. This pressure differential prevents air from entering the head.

8 Claims, 2 Drawing Figures

MAINTENANCE SYSTEM TO PRIME AND TO EXCLUDE AIR FROM INK JET HEADS

BACKGROUND OF THE INVENTION

1. Field of the Invention

The present invention relates to ink jet printing systems in general, and more particularly, to maintenance devices used to improve the performance of said printers.

2. Prior Art

The use of nonimpact printers using multinozzle or single nozzle print heads for printing readable data on a recording surface is well known in the prior art. Such printers may be divided into the drop-on-demand type printers and the continuous type printers. In the drop-on-demand type printers, a drop of print fluid is generated from the print head or the drop generator when needed. In the continuous type printers, continuous streams of ink are extruded from the drop generators. A vibrating crystal vibrates the ink so that the continuous streams are broken up into regularly spaced constant size droplets. The droplets are used selectively for printing on the recording surface. Although the present invention finds use with either type of ink jet printer, it works well with the continuous type printers and therefore will be described in association therewith.

The prior art abounds with continuous type ink jet printers. Generally, these printers consist of a print head. The print head generates the ink droplets which are used to write on the recording media. The print head consists of a fluid chamber in which ink (which may be magnetic or conductive) is forced in under pressure. One or more discharging nozzles are in fluidic communication with the pressurized ink. A vibrating crystal in the fluid chamber perturbs the ink so that fluid emanating from the nozzles is broken up into droplets. The droplets are subsequently influenced by electric or magnetic means whereby some are used to print data onto a recording surface. Ink droplets which are not needed for printing are collected by a gutter assembly and returned or recirculated to the ink supply system for reuse. U.S. Pat. Nos. 3,848,118 and 3,924,974 are examples of this prior art.

One of the problems which plagues this prior art ink jet system is the inability to control the streams so that ink jet components such as charge electrodes and deflection electrodes are not contaminated with the ink. The problem is particularly pronounced at start-up and/or shutdown of the system. During the start-up and/or shutdown interval, the behavior of the streams tend to be nonstable or erratic and, as a result, wetting of the components is inevitable.

It is believed that the stream's erratic behavior or stream's misdirectionality is caused by one or more of the following factors: (a) the presence of foreign material in the ink jet head, (b) lack of control over ink movement in the head, (c) the presence of air in the head and (d) relatively high compliance of the ink jet head.

Foreign materials that are trapped inside an ink jet head have the potential to obstruct ink flow through the nozzles and seriously degrade head reliability. Generally microscopic size particles pass through the nozzles. These particles are likely to change the stream's break-off characteristics and affect the trajectory of the droplets. Large size particles and gas bubbles are more disruptive to the ink flow. Large size particles may be solids or nonsolids. The solid particles tend to partially close the nozzle openings. The partial closing reduces ink flow through the nozzle. The result is that the ink stream break-off distance is shortened which further results in stream misdirectionality. Nonsolid particles tend to form globules that seal off the nozzles and stop ink flow. Gas bubbles tend to seal off the nozzles and stop ink flow. Over a period of time, these bubbles partially dissolve until they are small enough to pass through the nozzles. As they exit the nozzles, they explode, causing splatter on nearby objects.

The gas bubbles also act as shock absorbers. They compress as ink pressure increases and expand as the pressure decreases. This increases the compliance characteristics of the ink jet head.

The need to control ink movement through the head of an ink jet printer is critical at start-up and/or shutdown. During normal operation, the head is pressurized. At shutdown, the head pressure goes from a positive value to ambient or subambient value. Ideally, the change in pressure should be instantaneous with no overshoot. However, to depressurize the head requires the removal of ink. When nozzles are used to vent ink from the head, the head's pressure decays exponentially. One of the adverse effects of exponential decay is that the streams usually vary from the normal trajectory. As the streams vary, gravity becomes the dominant force acting on the streams. Since gravity tends to pull an object downwardly, the ink generally oozes from the nozzles and wets the components below. The longer the decay, the greater the problem. At start-up or turn-on time, the ideal condition is for the pressure in the head to rise instantaneously from ambient to a positive operating value. However, each ink jet head has its own characteristic compliance which forces the pressure to rise exponentially. As with exponential pressure fall, exponential pressure rise results in stream instability and subsequent component's contamination. The longer the rise time, the more pronounced the contamination.

The presence of air in the ink jet head is another factor which degrades the performance of the head. The air forms bubbles which act as shock absorbers. These shock absorbers degrade the compliance of the head. Compliance refers to the response time for the head. It is the time which is needed to turn the head on or off. The head is turned on when the streams are properly oriented and can be used for writing on a support media. The shorter the time, needed to turn on or turn off the head is, the better the head's compliance is. It therefore behooves the user to exclude air from the head.

Air may enter the head due to a phenomenon referred to as thermal cycling. Thermal cycling is the term used to describe the temperature fluctuations associated with a head. The temperature fluctuation changes the volume of ink in the head. When the temperature decreases, the ink volume contracts and air is drawn into the head. When the temperature increases, the ink volume increases and the excess ink dribbles from the nozzle to contaminate adjoining components.

U.S. Pat. No. 3,805,276 describes a device for removing air from an ink jet recording apparatus. The device includes a supplementary ink holder and a valve.

The input end of the valve is coupled to the conduit which supplies ink to the nozzle. The output end of the valve is coupled to the ink holder. During nonprinting periods, the valve is opened and air escapes from the conduit into the tank.

SUMMARY OF THE INVENTION

The ink jet recording device of the present invention includes a print head cavity having a supply chamber and a settling chamber along with a supplementary fluidic system which is coupled through a valving system into the settling chamber of the print head. The configuration is such that at turn-off time, the supplementary fluidic system is in fluidic communication with the print head. This decompresses the head at a rapid but controlled rate. The supplementary fluidic system further ensures that the pressure ($P_h$) in the head is greater and or equal to ambient pressure $P_a$. The pressure differential prevents air from entering the head.

The supplementary fluidic system includes a rapid decompression regulator having an input end coupled to the valving system. The output end of the regulator is vented by a fluid conduit into a fluid-containing reservoir. The regulator prevents the head pressure from falling below ambient pressure.

In one feature of the invention, the fluid reservoir is disposed in a generally vertical plane below the print head and its associated nozzle. Ink is pulled from the head until capillary force establishes a volume of ink in each nozzle. The meniscus which is associated with each volume of ink is usually concave and prevents ink from oozing out of the nozzles. The volume of ink in each nozzle prevents air from entering. The pressure in the fluid reservoir is controlled by venting the reservoir to atmosphere.

The foregoing features and advantages of the invention will be apparent from the following more particular description of a preferred embodiment of the invention, as illustrated in the accompanying drawings.

DETAILED DESCRIPTION OF THE PREFERRED EMBODIMENT

The performance of an ink jet printing device is improved by the attachment of a supplemental fluidic system or device which prevents air from entering the print head. The supplementary fluidic device is particularly effective at shutdown intervals. The supplementary fluidic system includes a rapid decompression regulator which is coupled to a flush port of the ink jet head. The exit port of the rapid decompression regulator is vented by a pipe into a valve vent reservoir. At shutdown time, the conduit which supplies ink to the head is closed and the flush port is opened. As the pressure in the ink head falls, ink escapes from the head through the rapid decompression regulator into the valve vent reservoir.

The extraction of ink from the head is controlled by the rapid decompression regulator so that the final pressure in the head is greater than or equal to the ambient pressure $P_a$. This pressure differential ensures that air cannot enter the head. The valve vent reservoir controls the volume of ink which remains in the ink jet head. Ink is pulled from the head until capillary action establishes minute volume of ink in the nozzles. The presence of ink in the nozzles further exclude air from entering the head. In the event of temperature change, referred hereinafter as thermal cycling, ink is extracted from the head into the reservoir or is extracted from the reservoir into the head. The direction of ink flow depends on whether or not the temperature increases or decreases.

The invention further discloses a method for flushing an ink jet head so that debris, air bubbles, etc. are removed from the head. The flushing procedure is particularly effective when a head is initially incorporated in an ink jet printing system. In essence, the procedure requires that an entry port and flush port be fabricated on one side of the ink jet head. Preferably, the entry port is disposed at the bottom of the head. As such, as ink rushes from the bottom of the head, air bubbles or debris in the head are forced to the top and escape through the flush port. Debris in the nozzle is removed by supplying a pressurized fluid at the front of the nozzle and forcing the fluid to flow through the nozzles into the head cavity. This procedure is referred to as back-flushing the head.

Figure 1:
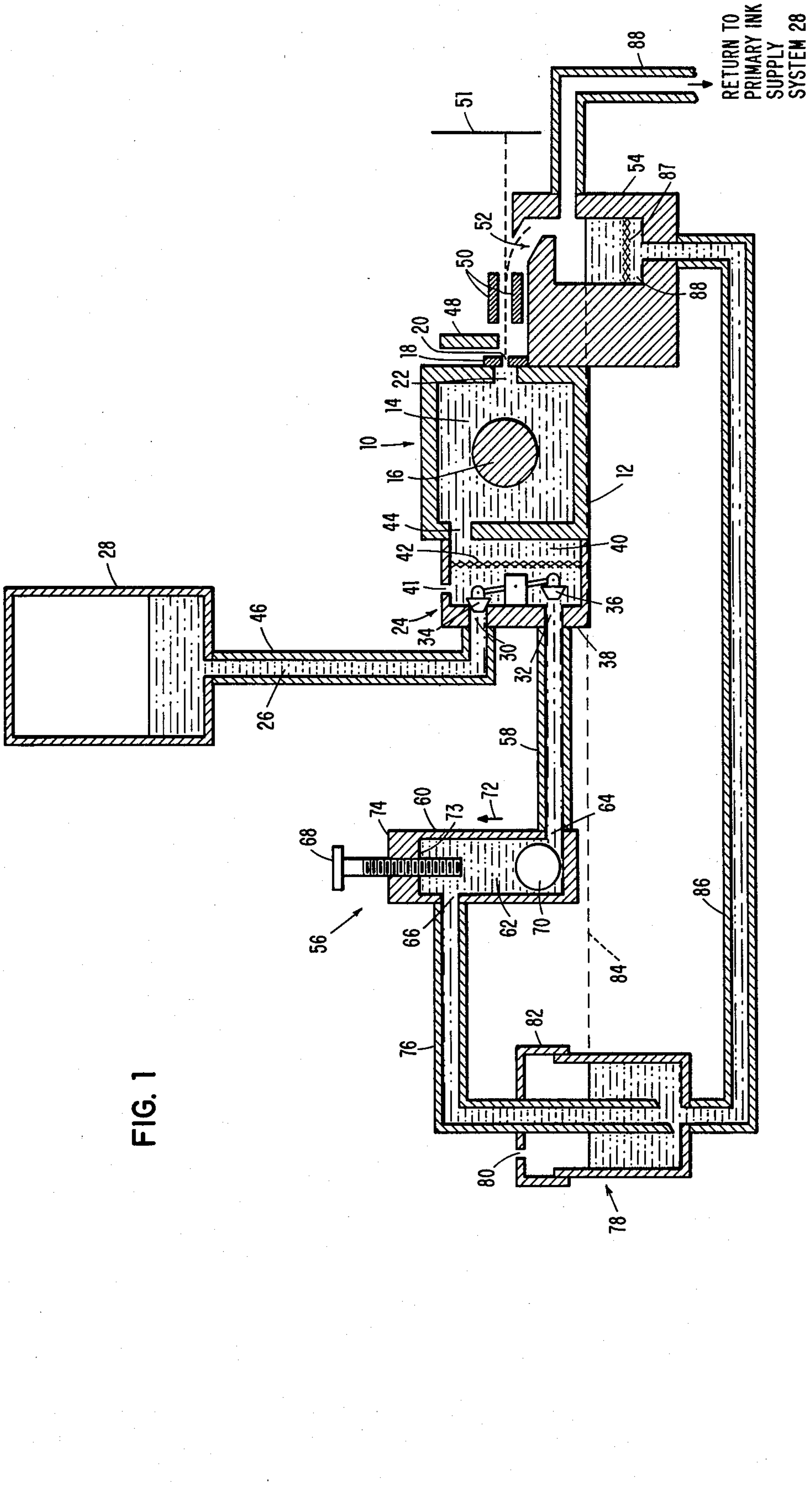
FIG. 1 is a schematic diagram of an ink jet recording device embodying the teachings of the present invention.

Referring now to FIG. 1, a cross section of an ink jet print head and the supplementary fluidic system is shown. The ink jet head 10 includes a housing 12. The housing 12 surrounds an ink supply cavity 14. A crystal 16 is disposed within the ink supply cavity 14. A nozzle plate 18 is rigidly mounted to the housing 12. A plurality of minute openings, only one of which is shown in the figure and identified by numeral 20, is disposed in side-by-side relationship along a straight line in the nozzle plate. Each of the minute openings is coupled by a communicating channel to the ink supply cavity 14. In FIG. 1, the communicating channel is identified by numeral 22.

Still referring to FIG. 1, a valve assembly means 24 is coupled to head housing 12. The function of the valve assembly means 24 is to control the flow of ink 26 into and out of ink supply cavity 14. In the preferred embodiment of this invention, the valve assembly means 24 is an automatic valve assembly which includes a supply port 30 and an exit or flush port 32. A pair of port closing members 34 and 36 are pivotally mounted to the valve housing 38. A settling chamber 40 is surrounded by the valve housing 38 and the head housing 12. A conventional filtering member 42 is placed within the settling chamber 40. The filtering member 42 is positioned so that opposite sides are firmly fixed against opposite walls of the valve housing 38. A vent hole 41 is fabricated in the valve housing. The vent hole is disposed on the input side of the filtering member. The function of the hole is to allow air bubbles, etc. to escape from the ink. It should be noted that by positioning the vent hold on the upstream side of the filter, the time which is required to flush the head and to remove air bubbles therefrom is significantly reduced.

The settling chamber 40 and the supply cavity 14 are coupled by interconnecting channel 44. A pipe identified by numeral 46 interconnects the primary ink supply system 28 to the settling chamber 40. The primary ink supply system 28 is a conventional ink system which is used with ink jet printers. As such, the details of the system will not be given. Suffice it to say that the primary ink supply system 28 includes a pump (not shown) which supplies ink 26 under pressure to the ink supply cavity 14 of the ink jet head 10. The ink supply system 28 is also fitted with entry ports (not shown) through which new and recycled inks enter.

In operation, the automatic valve closes exit port 32 and entry port 30 is opened. Ink rushes through the pipe 46 into the settling chamber 40. The ink is filtered by the filter 42. As such, any foreign body which is in the ink, is separated by the filter. The filtered ink travels through interconnecting channel 44 into ink supply cavity 14. When the crystal 44 is excited by a conventional electrical circuit (not shown), ink, which is expelled through opening 20, breaks up into a plurality of regular size and regular space ink droplets. As droplets detach from the ink streams, they are selectively charged by charge electrode 48. Downstream from the charge electrode is the deflection plate 50. Droplets which are charged, are deflected for printing on media 51. Uncharged droplets fly along a path 52 where they are collected by gutter assembly means 54. The unused droplets which enter gutter assembly means 54 are recirculated via conduit 88 to the primary ink supply system 28 for reuse.

Still referring to FIG. 1, a rapid decompression regulator 56 is coupled by pipe 58 into exit port 32 of the automatic valve assembly. As was stated previously, during normal operation, the exit port 32 is closed by valve closing member 36. As such, the schematic of FIG. 1 shows the head in the shut-down mode of operation. The pressurized ink 26 which is supplied to the ink jet head creates a pressure in the head. However, at shutdown, the entry port 30 is closed by valve closing member 34. The pressure in the head begins to fall as ink escapes through exit port 32. As such, the function of the rapid decompression regulator 56 is to control the rate at which ink escapes from the head so that the ink pressure inside the head $P_h$ is greater than or equal to ambient pressure $P_a$. This pressure differential prevents air from entering the head.

The rapid decompression regulator 56 includes an elongated housing member 60. The housing member 60 is fitted with a central cavity or opening 62. In the preferred embodiment of this invention, the housing member is cylindrical. The housing includes an entry port 64 and an exit port 66. The rapid decompression regulator 56 is fitted into the ink jet system so that the entry port of the regulator is coupled to the compressed system which has to be decompressed. By way of example and with reference to FIG. 1, the compressed system is the ink jet head. It should be noted that the rapid decompression regulator can be used to decompress any compressed system.

An adjustable stop identified by numeral 68 is fitted into the walls of the housing member 60. The orientation of the adjustable stop 68 is such that it can be adjusted into and out of the cavity 62. In the preferred embodiment of this invention, the adjustable member 68 is a threaded screw which can be screwed into or out of the opening 62. A ball 70 is fitted into the cavity 62. The spacing between the outer surface of the ball and the side walls of the cavity control the rate of fluid flow within said cavity. Similarly, the adjustable stop 68 controls the position of the ball as it rises with fluid flow in the direction shown by arrow 72. The rapid decompression regulator 56 allows the compressed ink jet head 10 to decompress at a very high speed without overshooting ambient pressure. The compressed head is vented through the rapid decompression regulator 56. As such, when the inlet port of valve 24 is closed and the outlet port 32 is open, fluid rushes from the head into the rapid decompression regulator. As ink enters the cavity of the rapid decompression regulator, the ball is forced upward in the direction shown by arrow 72. Ink moves at a relatively fast rate about the outer surface of the ball and the side walls of the cavity. However, as soon as the ball reaches the top of the regulator cavity, the ball begins to restrict the flow of fluid through exit port 66. As such, the pressure in the head is maintained at a level equal to or greater than the ambient pressure. The position of the ball at the top of the cavity is set by the amount of the adjustable member 68 that is in the cavity. As soon as the exit port 32 is closed and ink stops flowing through regulator 56, the gravity returns the ball to its home position at the bottom of the regulator cavity.

In an alternate embodiment of the rapid decompression regulator, the adjustable member 68 is replaced by a solid upper wall 74. The solid upper wall is an integral part of the housing member 60. Of course, in this embodiment, the adjustable member 68 is not present in the cavity. As such, the ball moves from the bottom of the cavity in the direction shown by arrow 72 and is stopped by the lower surface 73 of wall 74. Still referring to FIG. 1, a pipe 76 connects the exit port 66 of the rapid decompression regulator 56 to a valve vent reservoir 78. The function of the valve vent reservoir is to store ink extracted from the head. The valve vent reservoir 78 is particularly useful during the period when the head is turned off. During this shutoff period, the head is susceptible to air ingestion. The air ingestion is the result of the so-called thermocycling phenomenom. The thermocycling phenomenom refers to rapid temperature fluctuation which is associated with the environment in which the ink jet head operates. If the temperature increases, ink volume in the head tends to expand. Absent the valve vent reservoir 78, ink dribbles down the front surface of the nozzle to wet the components positioned below the nozzles. If the temperature decreases, the ink volume tends to decrease and air is pulled into the head. However, by positioning the valve vent reservoir 78 within the supplementary ink system, if the volume of ink in the head increases, ink is pulled through the connecting pipe and the rapid decompression regulator 56 to the reservoir. If the volume of ink in the head decreases, ink is pulled from the reservoir into the head. To this end, the valve vent reservoir behaves or functions as an expansion/contraction chamber to control the volume of ink in the head during the turn-off period.

In the preferred embodiment of this invention, the valve vent reservoir 78 is a fluid-containing reservoir disposed to accept ink flowing through pipe 76. The pipe 76 is vented below the level of fluid in the valve vent reservoir 78. A vent hole 80 is disposed in the top or cover section 82 of the reservoir 78. The vent hole 80 prevents pressure from building up in the reservoir. It is preferable that the reservoir be mounted in a vertical orientation but below the ink jet head 10. With this orientation, ink is pulled from supply cavity 14 under the power of gravity until capillary forces establish a meniscus (not shown) in each of the nozzles or minute openings identified as numeral 20. With the meniscus in each opening, air is further prevented from entering into the head.

As was stated previously, the pipe 76 vents the rapid decompression regulator 56. One end of the pipe is below the fluid level in the valve vent reservoir 78. This ensures that air will not enter the head through the pipe. The ink level in the valve vent reservoir 78 is controlled so that it remains at the level identified by numeral 84.

A pipe member 86 interconnects the bottom of the valve vent reservoir 78 to the sump 88 disposed in gutter assembly means 54. Thus the gutter assembly means 54 acts as an automatic fluid level control for the valve vent reservoir. A filter 87 is placed in the sump. The filter filters ink which is entering the supplementary fluid system through the gutter assembly. As was stated previously, the function of the gutter assembly means 54 is to collect unused ink and recirculate the same to the primary ink supply system 28 for reuse. A vacuum return line 88 returns ink which exceeds the level 84 in sump 88 to the primary ink supply system 28. The volume of ink in sump 88 is partially supplied from the unused droplets. Should the ink level in the reservoir fall below level 84, then ink is pulled from sump 88 through line 86 until the level is reestablished at its predetermined height. Likewise when the ink level rises above height 84, the excess ink is pulled by vacuum through line 88 into the primary ink supply system.

It should be noted that exit port 32 also functions as the flush port for the head. To this end, any conventional coupling means (not shown) can be used to couple pipe 58 to the valve assembly 24. As such, the supplementary fluid system can be decoupled from the head and the head is flushed through exit port 32. Alternately, the flushing can occur with the supplementary fluid system coupled to the exit port. Also, the connecting conduits or pipe in FIG. 1 may be flexible or rigid.

Figure 2:
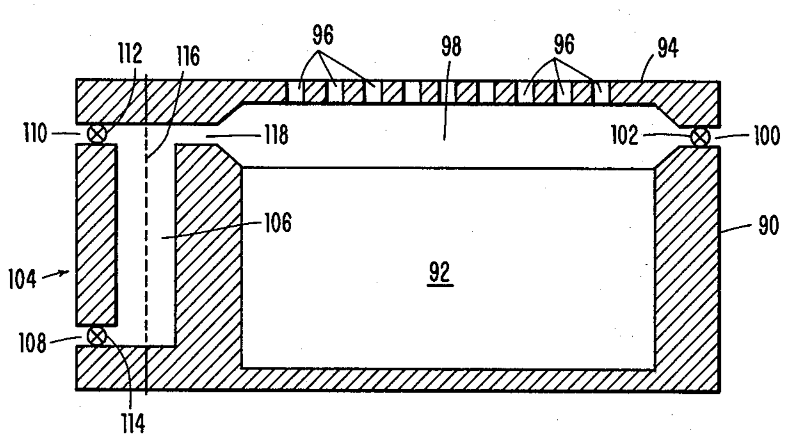
FIG. 2 is a schematic showing a preferred configuration of an ink jet head for effective flushing.

Referring now to FIG. 2, there is shown a schematic for an ink jet head which can be adopted for use in the ink jet printing device of FIG. 1. In fact, the ink jet head of FIG. 2 can be used in any ink jet printing system. The ink jet head includes a head housing 90. A crystal (XTAL) 92 is fabricated in the head housing. A nozzle plate 94 is coupled to head housing 90. The nozzle plate includes a plurality of minute openings 96. The nozzle plate cooperates with the head housing and the crystal 92 to form an ink supply cavity 98. Although the shape of the ink supply cavity 98 can have any geometric pattern, in the preferred embodiment of this invention, the ink supply cavity 98 has an oblong shape. With this specific shape, as ink is introduced into the cavity, debris or air bubbles which cling to a side wall of the cavity are easily flushed from the system.

A flush port 100 is disposed on one side of the head. A conventional valve assembly 102 is fitted in the flush port. As will be described hereinafter, the flush port is utilized for flushing debris from the head when the head is first coupled into an ink jet print system. Once the head is flushed, the port is closed and the head is used for normal printing. An input valve assembly 104 coacts with the head housing 90 to form a settling tank or reservoir 106. The valve system 104 includes an inlet port disposed at the bottom of the head and identified by numeral 108 and a filter flush port 110 disposed at the top of the head. A pair of conventional valve assemblies with associated seating members 114 and 112 are disposed in the ink input port 108 and the flush port 110, respectively. The valve assemblies 112 and 114 may be controlled independently or as a unit.

The shape of the settling tank can be designed to enhance the flushing characteristics of the head. When this head is coupled into an ink jet printer system, the inlet port 108 is coupled to the primary ink supply system. As such, ink comes into the head through the bottom of the settling chamber. This ensures that ink flow and gravity will force all gases and debris to the top of the chamber. The debris is then flushed from the head through port 110. A filter 116 is disposed in the settling chamber. As before, the filter prevents foreign matter in the ink from entering into the supply cavity. A communicating channel 118 interconnects the settling chamber with the supply chamber. It should be noted that the showing of the ink jet head in FIG. 2 is schematic. As such, the components such as the head housing, input valve assembly 104 and nozzle plate 94 are shown in spaced-apart relationship. However, in practice, these components are tightly coupled or fixed onto the head housing so that fluid cannot leak from the head. The key element in the design in FIG. 2 is the fact that ink is brought into the head at the bottom and that there are two flush ports on opposite sides of the head. One is at the input side of the head and the other is on the downstream side of the head. As such, ink rushes into the settling tank from the bottom of the head. Debris and air bubbles are forced to the top and can be flushed from the head through the flush port or the nozzle. Debris and gases on the input side of the nozzle can be removed from the head through filter flush port 110 while gas bubbles and debris on the output side of the filter can be flushed from the head through flush port 100 and the openings in the nozzle plate.

It should be noted that once a new head is placed within an ink jet printing device, the head must be primed so that it can be used for subsequent writing. The priming procedure includes flushing the head so that debris, which is in the head as a result of the manufacturing process, or air bubbles in the head are removed. Once the head is primed, it is then coupled in the configuration shown in FIG. 1. The supplementary fluidic system prevents air from entering into the head.

Flushing is most effectively accomplished when performed in accordance with the following steps:

(a) Open both flush ports 110 and 100. In the event that the head has a single flush port, then only that port is open.

(b) Apply approximately 50 PSI ink pressure to the ink supply system which is coupled to inlet port 108. This ink under pressure flushes all loose foreign objects from the head.

(c) Close the filter flush port 110. As is shown in FIG. 2, this filter flush port is on the input side of the head.

(d) Reduce the ink pressure to approximately 3 PSI.

(e) With the ink pressure reduced, the internal pressure in the head is also reduced. Backflush the nozzles by blowing pressurized distilled water or other fluids from the front surface of the nozzles through the minute openings. This dislodges any foreign objects in the nozzles and forces them into the supply reservoir 98. The low pressure in the head ensures that the dislodged foreign objects flow toward flush port 100.

(f) Increase ink pressure to approximately 50 PSI.

(g) Repeat steps (c) through (f) until all the streams emanating from the head are properly directed. With all the streams properly directed, the flush ports or port are closed and normal printing is undertaken.

Although the procedure for flushing the head is described in accordance with the print head described in FIG. 2, it should be noted that the procedure is applicable to any print head which has an inlet port through which ink is conveyed into the supply cavity of the print head and a flush port through which the head can be flushed. The flush port may be located on the upstream or downstream side of the head.

The above teaching shows that ink jet head pressure must never be allowed to fall below ambient pressure or else air will enter into the head and seriously degrade the head's performance. The degradation appears in the form of slower starts, less efficient drop generation, misdirected streams and slower stops. Clean starting and/or stopping of the ink jet printing system is achieved by the present invention.

In operation, when a new head is first fitted into an ink jet printing device, the head is flushed in accordance with the above-described procedure. This procedure ensures that debris and air are removed from the head. The head is then coupled with the supplementary fluidic system described above. This system is geared to prevent air from entering the head. At shutdown time, as soon as the valve-closing member 34 (FIG. 1) closes, pressure rapidly falls inside the ink jet head. The rate at which pressure falls is determined by the size of the nozzles and the valve vent port 32 (FIG. 1). The movement through the valve vent port 32 forces ball 70 of the rapid decompression regulator upward. After the ball reaches the top, the pressure in the head is greater than ambient or atmospheric. As such, ink is now forced to flow between the ball and chamber walls. This ensures that the inside head pressure is slightly above ambient, which prevents air from entering the nozzles. After ink movement stops, the ball settles back to the bottom to await the next turn-off cycle.

Since the valve vent reservoir 78 is mounted slightly below the level of the head, gravity draws ink out of the head into the valve vent reservoir until capillary force establishes a minute volume of ink in each nozzle. The boundaries or meniscus for each volume of ink associated with each nozzle, prevents air from entering into the head. In the event that the temperature decreases, ink is drawn from the valve vent reservoir to replace any lost ink volume. The effect of gravity in the ink will draw any surplus of ink from the head should temperature increase. The vent hole 80 in valve vent reservoir 78 prevents air pressure build-up in the reservoir. The ink level in the valve vent reservoir is maintained within safe limits by tube 86 which connects the reservoir to sump 88 in gutter assembly 54. Each time the ink jet head is turned on, the gutter assembly will replenish ink in the valve vent reservoir to the level identified by numeral 84. Ink in excess of level 84 is returned to the primary ink supply system. Conversely, if the level of fluid in the valve vent reservoir becomes too high, a corresponding change will occur in the gutter assembly and ink will be dumped in the return line to the ink supply reservoir for reuse.

While the invention has been particularly shown and described with reference to a preferred embodiment thereof, it will be understood by those skilled in the art that various changes in form and details may be made therein without departing from the spirit and scope of the invention.

What is claimed is:

1. In an ink jet printing device wherein pressurized ink is supplied to a print head cavity having a supply chamber and settling chamber and ink is expelled through one or more minute openings in the supply chamber to print indicia on a recording surface, an apparatus for preventing the entry of air into the supply chamber, said apparatus comprising:

an inlet port and an outlet port in the settling chamber;

a valve assembly means for opening said inlet port to convey pressurized ink into the cavity and for opening said outlet port to convey pressurized ink out of the cavity;

a rapid decompression regulator having an entry port and an exit port, said entry port coupled to the outlet port of the settling chamber;

said decompression regulator operable to control ink flow out of the cavity so that the head cavity decompressed first at a rapid rate and subsequently at a slower controlled rate; and an ink reservoir vented to atmospheric pressure, coupled to the exit port of said regulator and operable to draw ink from the cavity when said valve assembly means opens said outlet port and closes said inlet port; the ink being drawn out of the cavity until ink in the cavity is near atmospheric pressure and capillary action establishes a volume of ink in each opening thereby blocking air from entering the cavity.

2. The apparatus of claim 1 and in addition:

said regulator having a central chamber disposed in a general vertical orientation interconnecting the entry port and the exit port;

a flow control means disposed within said central chamber and operable to be transposed by ink flow from a position next to the entry port whereat the ink flow is less restricted to a position next to the exit port whereat the ink flow is more restricted so that the ink pressure in the cavity is prevented from going below atmospheric pressure as the pressure is released through said regulator.

3. The apparatus of claim 2 wherein said central chamber is cylindrical.

4. The apparatus of claim 3 wherein said flow control means is a ball.

5. The apparatus of claim 4 further including:

an adjustable stop for said ball disposed adjacent the exit port of said central chamber.

6. An improved ink jet head suitable for use with an ink jet printing system comprising:

a housing having a supply chamber therein for containing a supply of ink;

a nozzle plate having a plurality of nozzles therein mounted on one side of the housing and in fluidic communication with the chamber;

a drive crystal associated with the chamber and operable to vibrate the chamber so that ink outputted through the nozzles is broken up into a plurality of droplets;

a settling chamber disposed in the housing and in fluidic communication with the supply chamber;

an ink inlet port fabricated in one end of the housing and operable to convey ink into the bottom of the settling chamber so that ink flow and gravity forces air toward the top of said chamber;

a first flush port disposed at the top of the settling chamber; and a second flush port disposed on the opposite end of the housing downstream from the first flush port and in fluidic communication with the supply chamber.

7. The improved ink jet head of claim 6 wherein the supply chamber is being disposed in a general horizontal orientation; and the settling chamber is being disposed in a general vertical orientation.

8. The improved ink jet head of claim 6 further including a filtering means operable to filter ink exiting from the settling chamber into the supply chamber.

* * * * *